(12) United States Patent
D'Ercole et al.

(10) Patent No.: US 9,995,143 B2
(45) Date of Patent: Jun. 12, 2018

(54) GEARED AXIAL MULTISTAGE EXPANDER DEVICE, SYSTEM AND METHOD

(71) Applicant: Nuovo Pignone S.P.A., Florence (IT)

(72) Inventors: Michele D'Ercole, Florence (IT); Simone Billi, Florence (IT); Stefania Della Gatta, Florence (IT)

(*) Notice: Subject to any disclaimer, the term of this patent is extended or adjusted under 35 U.S.C. 154(b) by 352 days.

(21) Appl. No.: 14/625,067

(22) Filed: Feb. 18, 2015

(65) Prior Publication Data

US 2015/0240640 A1  Aug. 27, 2015

Related U.S. Application Data

(62) Division of application No. 13/184,703, filed on Jul. 18, 2011, now abandoned.

(30) Foreign Application Priority Data

Aug. 27, 2010 (IT) .............................. CO2010A0046

(51) Int. Cl.
*F02C 3/107* (2006.01)
*F01D 1/04* (2006.01)
(Continued)

(52) U.S. Cl.
CPC .............. *F01D 1/04* (2013.01); *F01D 15/08* (2013.01); *F01D 15/10* (2013.01); *F01D 15/12* (2013.01);
(Continued)

(58) Field of Classification Search
USPC .................................. 60/805; 415/65, 66, 68
See application file for complete search history.

(56) References Cited

U.S. PATENT DOCUMENTS 3,672,160 A    6/1972  Kim
3,673,802 A    7/1972  Krebs et al.
(Continued)

FOREIGN PATENT DOCUMENTS

EP     0787895 A2    8/1997
EP     1577491 A1    9/2005
(Continued)

OTHER PUBLICATIONS

Italian Search Report and Written Opinion issued in connection with corresponding IT Application No. CO2010A000046 dated May 10, 2011.
(Continued)

*Primary Examiner* — Arun Goyal
(74) *Attorney, Agent, or Firm* — GE Global Patent Operation

(57) ABSTRACT

Method, system and axial multistage expander including a casing and a plurality of stages. A stage includes a stator part connected to the casing and having plural statoric airfoils, and a rotor part configured to rotate relative to the stator part and having plural rotoric airfoils. The axial multistage expander also includes a support mechanism connected to the casing and configured to rotatably support the rotor part. Rotoric airfoils of at least one stage of the plurality of stages are configured to rotate with a speed different from rotoric airfoils of the other stages. The stator part, the rotor part and the support mechanism of the plurality of stages are provided inside the casing.

12 Claims, 11 Drawing Sheets

(51) Int. Cl.
  *F02C 6/14*   (2006.01)
  *F02C 6/18*   (2006.01)
  *F01D 15/08*  (2006.01)
  *F01D 15/10*  (2006.01)
  *F01D 15/12*  (2006.01)
(52) U.S. Cl.
  CPC ............... *F02C 3/107* (2013.01); *F02C 6/14* (2013.01); *F02C 6/18* (2013.01); *Y10T 29/4932* (2015.01)

(56) References Cited

U.S. PATENT DOCUMENTS

| | | | |
|---|---|---|---|
| 4,064,690 | A | 12/1977 | Kronogard |
| 4,105,372 | A | 8/1978 | Mishina et al. |
| 4,220,057 | A | 9/1980 | Kronogard |
| 4,251,987 | A | 2/1981 | Adamson |
| 4,916,894 | A | 4/1990 | Adamson et al. |
| 5,106,261 | A | 4/1992 | Bosen et al. |
| 5,466,198 | A | 11/1995 | McKibbin et al. |
| 8,292,570 | B2 * | 10/2012 | Suciu ............... F01D 5/026 415/68 |

FOREIGN PATENT DOCUMENTS

| | | |
|---|---|---|
| EP | 2085586 A2 | 8/2009 |
| EP | 2199568 A2 | 6/2010 |
| EP | 2213866 A2 | 8/2010 |
| GB | 1204321 A | 9/1970 |
| GB | 1233718 A | 5/1971 |
| GB | 2443743 A | 5/2008 |
| WO | 2006059970 A2 | 6/2006 |

OTHER PUBLICATIONS

European Search Report and Written Opinion issued in connection with corresponding EP Application No. 11178299.1-2321 dated Nov. 11, 2011.

Non-Final Rejection towards corresponding U.S. Appl. No. 13/184,703 dated Aug. 19, 2014.

* cited by examiner

GEARED AXIAL MULTISTAGE EXPANDER DEVICE, SYSTEM AND METHOD

CROSS-REFERENCE TO RELATED APPLICATIONS

This application is a divisional of U.S. patent Ser. No. 13/184,703, filed Jul. 18, 2011, which is hereby incorporated by reference in its entirety.

BACKGROUND OF THE INVENTION

Field of the Invention

Embodiments of the subject matter disclosed herein generally relate to methods and systems and, more particularly, to mechanisms and techniques for providing an axial multistage expander.

Description of Related Art

During the past years, with the increase in price of fossil fuels and the enhanced awareness of the public towards energy problems, the interest in developing new technologies or optimizing the existing technologies for reducing energy waste has dramatically increased. Thus, the various energy intensive industries are now looking at ways of reducing their dependency on non-renewable energy sources and also at ways of reducing the energy consumption.

One such way for reducing the energy consumption is minimizing the energy wasted during the production phase. For example, the power industry generates energy by burning coal or natural gas or by using a nuclear reaction for producing heat. After heat from these processes is used for generating the electricity, hot gases are released to the environment. These hot gasses (waste gas) are the carrier of the waste energy. Other examples of large producers of waste energy include blast furnaces, cryogenic devices, oil refineries, chemical plants, etc.

Expanders are used to recover energy from process tail or waste gas. The energy recovered by the expander, which would otherwise be wasted, is used to drive other equipment needed for the process (air compressor) or to produce electricity (generator drive) thereby increasing the efficiency of the plant. Common applications of the expander include: steel mills (blast furnace), air separation plants (cryogenic), oil refineries, chemical plants (nitric acid, ethylene oxide), etc.

An expander 10 is illustrated in FIG. 1 and this figure illustrates not only the size of such a device but also the main components of the expander, i.e., outer casing 12, nose cone 14, stator 16, and diffuser 18. Another component of the expander that is not shown in FIG. 1 is the rotor. FIG. 2 shows an open expander exposing the rotor 20 having plural rotoric airfoils 20a. FIG. 2 also shows the stator 16 having plural airfoils 16a. While the plural statoric airfoils 16a are fixed relative to the casing 12, the plural rotoric airfoils 20a are configured to rotate with rotor 20 relative to casing 12. The rotor 20 is connected to a shaft 22 that facilitates the rotation of the rotor.

While in use, expander 10 is configured to receive a gas along arrows 24. The gas passes over the nose cone 14 of the expander, into the statoric airfoils (blades) 16a and impacts the rotoric airfoils 20a. The rotoric airfoils extract the energy from the gas and convert it into rotational energy through the rotor 20 and shaft 22. This expansion process results in a temperature drop in addition to recovery of the pressure energy.

FIG. 2 shows a single stage expander, i.e., a single rotor part 20 having a single set of airfoils 20a. However, it is possible to have multiple rotor parts having corresponding airfoils, all disposed on a same shaft and all rotating with a same angular speed as shown in FIG. 3. FIG. 3 shows an axial multistage expander 25 having a casing 26, a rotor 27 on which plural rotoric airfoils 28, corresponding to the multiple stages, are fixed so that airfoils 28 rotate together with the rotor 27. Corresponding statoric airfoils 29 are attached to a static part, e.g., the casing 26. Also shown in FIG. 3 is an inlet 30 and an outlet 32 of the expander 25.

However, to achieve the axial multistage expander with a high efficiency in the whole operating range and not to compromise the manufacturability (i.e., to maintain a reasonable height of the airfoils of the first stages), a high rotational speed of the expander rotor is required for the first stages. As the devices that are connected to the expander (e.g., power generator) require in general a lower rotation speed, traditionally, an external gearbox is placed between the expander and the device connected to the expander for matching the different rotational speeds.

In another application, two different axial expanders are used for recovering more hot energy. A first expander is a high speed axial expander (hence higher component stress and costs and requires better grade materials) coupled to a second lower-speed expander with a gearbox unit interposed between the two expanders. This design is illustrated in FIG. 4 in which the first axial expander 34 is coupled to the second axial expander 35 via an external gearbox 36. It is noted that the gearbox 36 is connected, outside expanders 34 and 35, to a shaft 38 of the first expander 32 and a shaft 40 of the second expander 34. This arrangement reduces the overall efficiency of the system and increases its complexity while potentially limiting the operability of the turbomachinery, and also increases the cost of the whole system and the maintenance as well.

Accordingly, it would be desirable to provide systems and methods that avoid the afore-described problems and drawbacks.

BRIEF SUMMARY OF THE INVENTION

According to one exemplary embodiment, there is an axial multistage expander that includes a casing and a plurality of stages. A stage includes a stator part connected to the casing and having plural statoric airfoils, and a rotor part configured to rotate relative to the stator part and having plural rotoric airfoils. The expander also includes a support mechanism connected to the casing and configured to rotatably support the rotor part. Rotoric airfoils of at least one stage of the plurality of stages are configured to rotate with a speed different from rotoric airfoils of the other stages, and the stator part, the rotor part and the support mechanism of the plurality of stages are provided inside the casing.

According to another exemplary embodiment, there is a system for expanding a gas. The system includes an axial multistage expander configured to receive the gas at high temperature and/or high pressure; and a driven machine connected to the axial multistage expander and configured to be driven by the axial multistage expander. The axial multistage expander includes a casing and a plurality of stages. A stage includes a stator part connected to the casing and having plural statoric airfoils, and a rotor part configured to rotate relative to the stator part and having plural rotoric airfoils. The expander also includes a support mechanism connected to the casing and configured to rotatably support the rotor part. Rotoric airfoils of at least one stage of the plurality of stages are configured to rotate with a speed different from rotoric airfoils of the other stages, and the stator part, the rotor part and the support mechanism of the plurality of stages are provided inside the casing.

According to yet another exemplary embodiment, there is a system for generating energy. The system includes a compressor configured to compress air; a combustion chamber fluidly connected to the compressor and configured to receive the compressed air and fuel and to burn a mixture of compressed air and fuel; an expander configured to receive hot gases from the combustion chamber; a thermal energy storage device configured to store thermal energy of the gases received from the expander; a gas storage device in fluid communication with the thermal energy storage device and configured to store the cooled gases; an axial multistage expander configured to receive the gases from the gas storage device after being heated by the thermal energy storage device; and a driven machine connected to the axial multistage expander and configured to be driven by the axial multistage expander. The axial multistage expander includes rotoric airfoils of at least one stage of a plurality of stages that are configured to rotate with a speed different from rotoric airfoils of other stages.

According to yet another exemplary embodiment, there is a method for assembling an axial multistage expander. The method includes providing a plurality of stages, the stages including a stator part connected to a casing and having plural statoric airfoils and a rotor part configured to rotate relative to the stator part and having plural rotoric airfoils; connecting the rotoric airfoils of at least one stage to a gearbox such that the rotoric airfoils rotate with a speed different from the rotoric airfoils of the other stages; installing a support mechanism to be attached to the casing; and rotatably attaching the rotor part to the support mechanism.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a multistage axial expander. However, the embodiments to be discussed next are not limited to these systems, but may be applied to other systems having multiple stages that need to rotate at different speeds.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is an axial multistage expander in which one or more stages includes rotoric airfoils configured to rotate with a first angular speed and the rotoric airfoils of the remaining stages are configured to rotate with a different second angular speed. A gearbox is provided inside the axial multistage expander to achieve the two different angular speeds. Due to the flowpath in the axial multistage expander (to be discussed later in more details), the rotor part of the one or more stages may be concentric to a shaft of the rotor part of the remaining stages. In another application, the rotor part of the one or more stages is in series with the rotor part of the remaining stages. Various embodiments addressing these features are discussed next.

Figure 5:
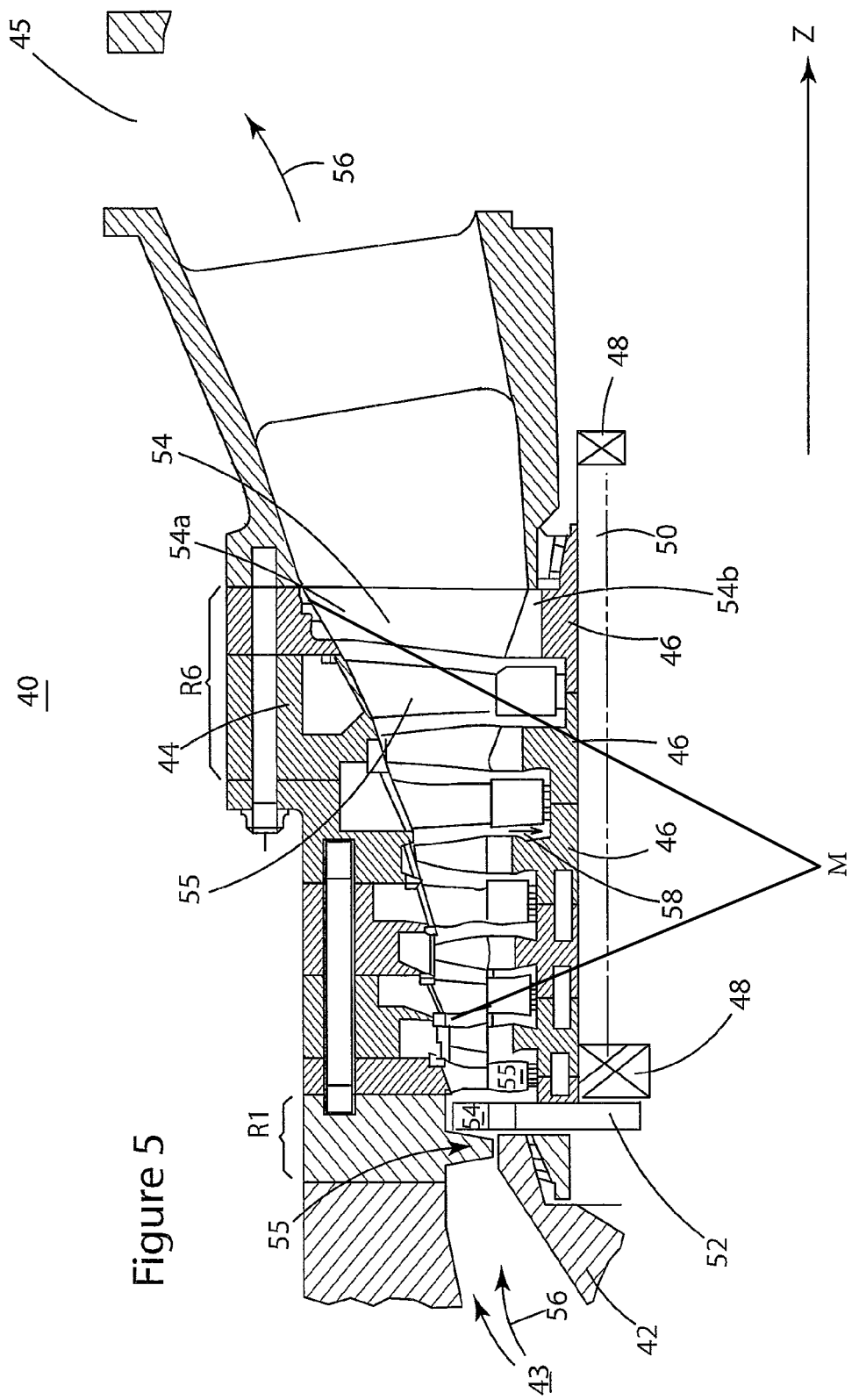
FIG. 5 is a schematic diagram of a axial multistage expander having an internal gearbox according to an exemplary embodiment.

According to an exemplary embodiment illustrated in FIG. 5, a multistage expander 40 includes a casing 42 that encloses a plurality of stages (R1 to R6). One or more stages may include a stator part 44 connected to the casing 42 and having plural statoric airfoils 55 and a portion of a rotor 50 with one rotoric disk 46 of a plurality of rotoric disks 46 (or rotor parts) on which rotoric airfoils 54 are provided. The rotor 50, the rotor disks 46 and the rotoric airfoils 54 are configured to rotate relative to the casing 42. For this reason, a support mechanism 48 is provided, for example, at both ends of the rotor 50. The rotor 50 includes at least a shaft (or two shafts as will be discussed later) on which the plural sets of rotor disks 46 are provided by any known anchoring system (e.g., mechanical key, axial pin, interferences, etc., or combination thereof). However, different configurations of the rotoric part are possible, for example, more or less stages may be present in the expander. The casing 42 may have an inlet 43 that receives the medium to be expanded and an outlet 45 that outputs the expanded medium.

As shown in FIG. 5, end tip slope (m) of the plural rotoric airfoils 54 increases along a longitudinal axis of the rotor part. FIG. 5 also shows a gearbox 52 connected between the rotoric airfoils 54 of the first stage R1 and the shaft 50. It is noted that for this exemplary embodiment, the first stage R1 rotates with a first rotational speed while the remaining stages R2 to R6 rotate with a second rotational speed. In one application, the gearbox may be placed on the rotoric disks 46 to support the airfoils 54 or the gearbox may completely replace the rotoric disks 46. In another application, the gearbox 52 may be placed between the rotoric airfoils and the statoric airfoils or under the rotoric airfoils of a given stage. In still another application, the gearbox is connected to the shaft and the rotoric airfoils of the first stage only. However, in yet another application, the gearbox is connected to the shaft and the rotoric airfoils of the first to second or first to third stages.

The stator part 44 has its own sets of statoric airfoils 55 that correspond to the rotoric airfoils 54. For clarity, it is noted that statoric airfoils 55 are fixed relative to the casing 42 while the rotoric airfoils 54 are configured to rotate relative to the casing 42. The statoric airfoils 55 together with the rotoric airfoils 54 form the flowpath 56 for the fluid (e.g., hot gases) passing the expander 40 along direction Z in FIG. 5.

The profile of the airfoils, both statoric and rotoric, determines the flowpath as discussed next. It is noted that one airfoil 54 of the set of rotoric airfoils has two regions. A first region 54a is exposed to directly interact with the fluid flow 56 while the second region 54b is embedded between adjacent tips of the statoric airfoils 55 of stages R1 to R6. In other words, leaks 58 of the fluid flow 56 through the expander 40 and not the entire flow 56 interact with region 54b. The shape and profiles of the regions 54a of the rotoric airfoils 54 and the corresponding regions of the statoris airfoils 55 define the airflow as shown in FIGS. 6 and 7.

Figure 6:
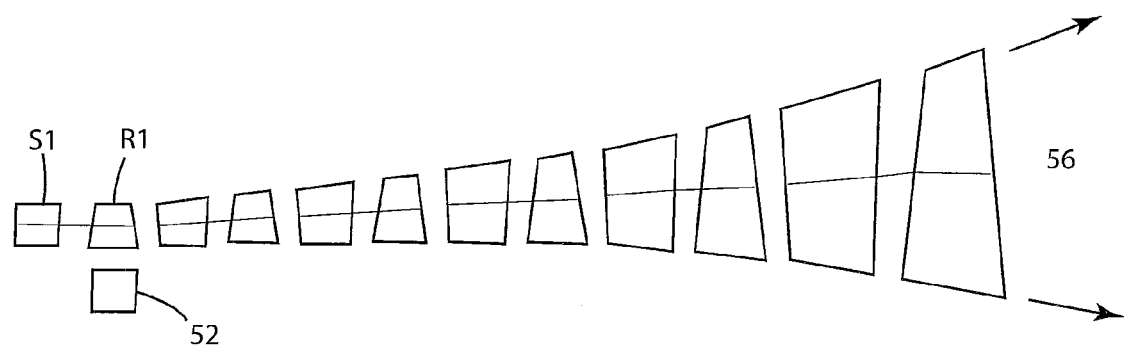
FIGS. 6 and 7 are schematic diagrams of axial multistage expanders having internal gearboxes according to an exemplary embodiment.

FIG. 6 shows a first embodiment for the flowpath, specifically designed for high pressure and variable mass flow inlet conditions. An expander having this type of flowpath is very complex (hence higher component stresses and costs and better grade materials) and requires a gear able to work with high torque. This configuration reduces an overall expansion efficiency and increases the complexity and the cost (high capital and maintenance cost for this type of gear), while potentially limiting turbomachinery operability and reliability.

Figure 7:
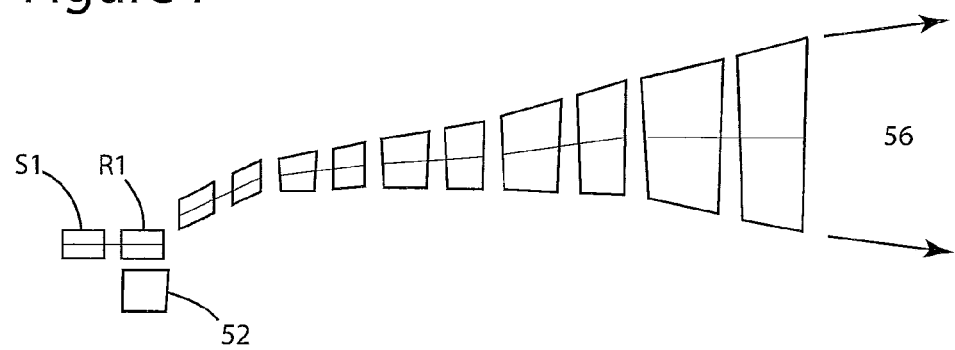

FIG. 7 shows a second embodiment for the flowpath specifically designed for a "low flow" inlet conditions. An expander having this type of flowpath can avoid the need of a gear but it reduces the aerodynamic efficiency for keeping a reasonable height for the first stage(s) in order to guarantee manufacturability and lower losses due to secondary flows.

According to an exemplary embodiment, FIGS. 6 and 7 also show the gearbox 52 provided, for example, at the rotoric airfoils 54 of the first stage R1. The gearbox may be configured to run the corresponding rotoric airfoils at a lower or higher rotational speed than a rotational speed of the rotoric airfoils 54 of the remaining stages R2 to R6. For example, the expander shown in FIG. 6 is configured to have the rotoric airfoils 54 of the first stage R1 driven at a lower rpm (rotations per minute) than the rotoric airflows of the remaining stages R2 to R6 while FIG. 7 illustrates an expander that is configured to have the rotoric airflows of the first stage R1 driven at a higher rpm than the rotoric airflows of the remaining stages. FIGS. 6 and 7 also show the flowpath 56.

Figure 8:
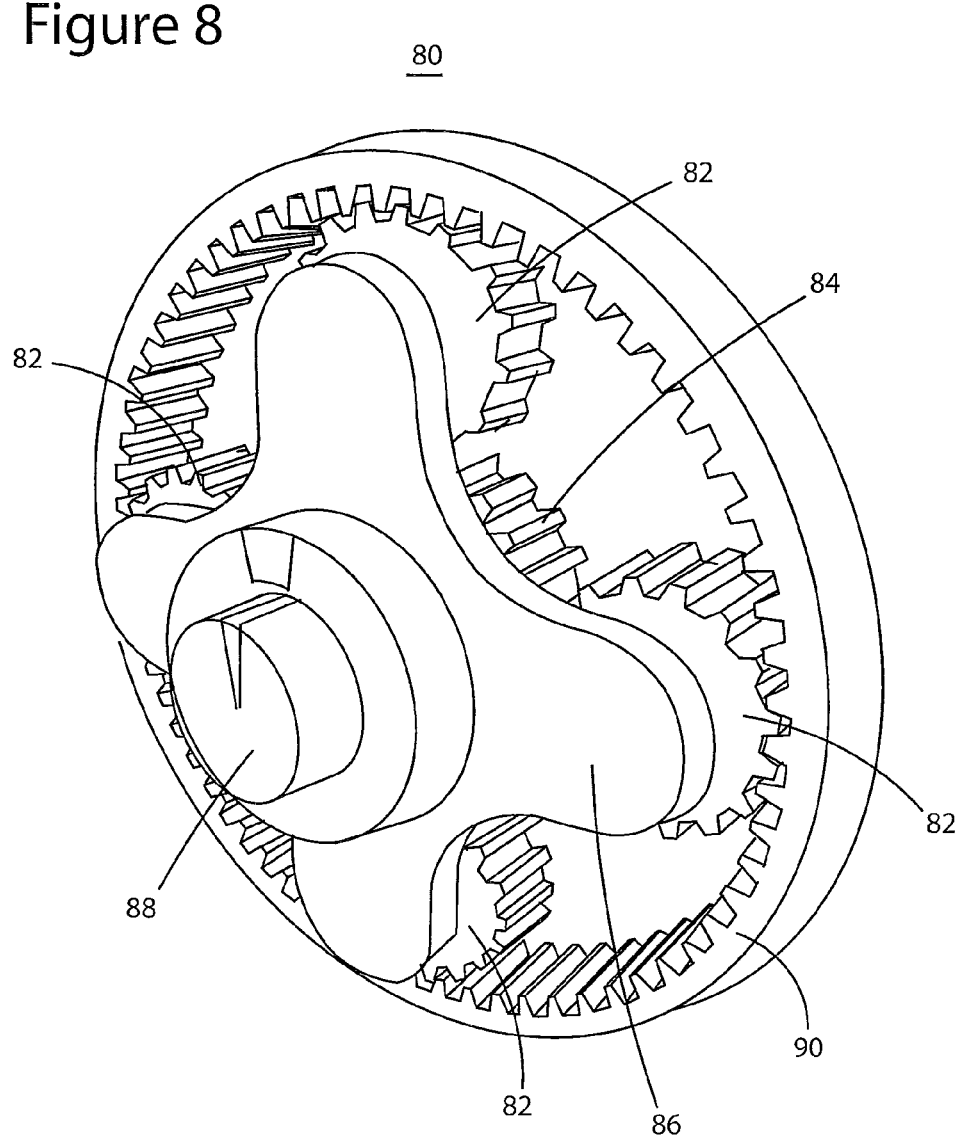
FIG. 8 is a schematic diagram of a epicyclic gearbox.

An example of the gearbox 52 that may be used inside the expander 40 is now discussed. Such gearbox is schematically shown in FIG. 8 as an epicyclic gearbox. Those skilled in the art would appreciate that other gearboxes may be possible.

Epicyclic gearing or planetary gearing is a gear system 80, see FIG. 8, that includes one or more outer gears 82, or planet gears, revolving about a central, or sun gear 84. The planet gears 82 may be mounted on a movable arm 86 or carrier which itself may rotate relative to the sun gear 84. The central gear 84 is connected to a shaft 88, which, in the context of FIG. 5 may be the shaft 50 of stages R2 to R6. The epicyclic gear 80 may be also incorporate the use of an outer ring gear 90 or annulus, which meshes with the planet gears 82. Depending on the configuration and design of the expander, the rotoric airflows of at least one stage may be directly connected to the outer ring gear 90.

Thus, with such an arrangement, the rotoric airfoils 54 of the first stage R1 are able to rotate with an angular speed different from the angular speed of the remaining rotoric airfoils of stages R2 to R6 and different from the angular speed of the shaft 50 on which the remaining rotoric airfoils are located. Also, the shaft may be directly connected to the shaft of the driven unit (power generator, compressor, pump, etc.) without a need of an external gear box. This configuration improves the operability of the expander as only one expander is necessary and not two expanders or an external gear-box for the same expansion conditions. In addition, this configuration may better manage the variable flows, reduce the overall train cost and weight, and allow to independently set the rotational speed of the first geared rotoric airfoils. Then, depending on the ratio between the planetary gear and the central gear the speed of the geared rotoric airfoils can be independently regulated.

The axes of all gears are usually parallel, but for special cases, the axes can be placed at an angle, introducing elements of bevel gear. Further, the sun, planet carrier and annulus axes are usually concentric.

Such a configuration allows for a low flow expander to apply a higher rotating speed for those rotoric airfoils connected to the planet gear while maintaining the remaining rotoric airfoils at a lower radius. Thus, higher airfoils may be used without increasing the aerodynamic load. For the no low flow expanders, this gear box allows the rotoric airfoils connected to the planet gear to rotate with a lower speed and to maintain a reasonable load coefficient with lower enthalpy drop, thus resulting in more power produced by the last rotor airflow that are usually more efficient, improving the overall performance of the machine.

Figure 1:
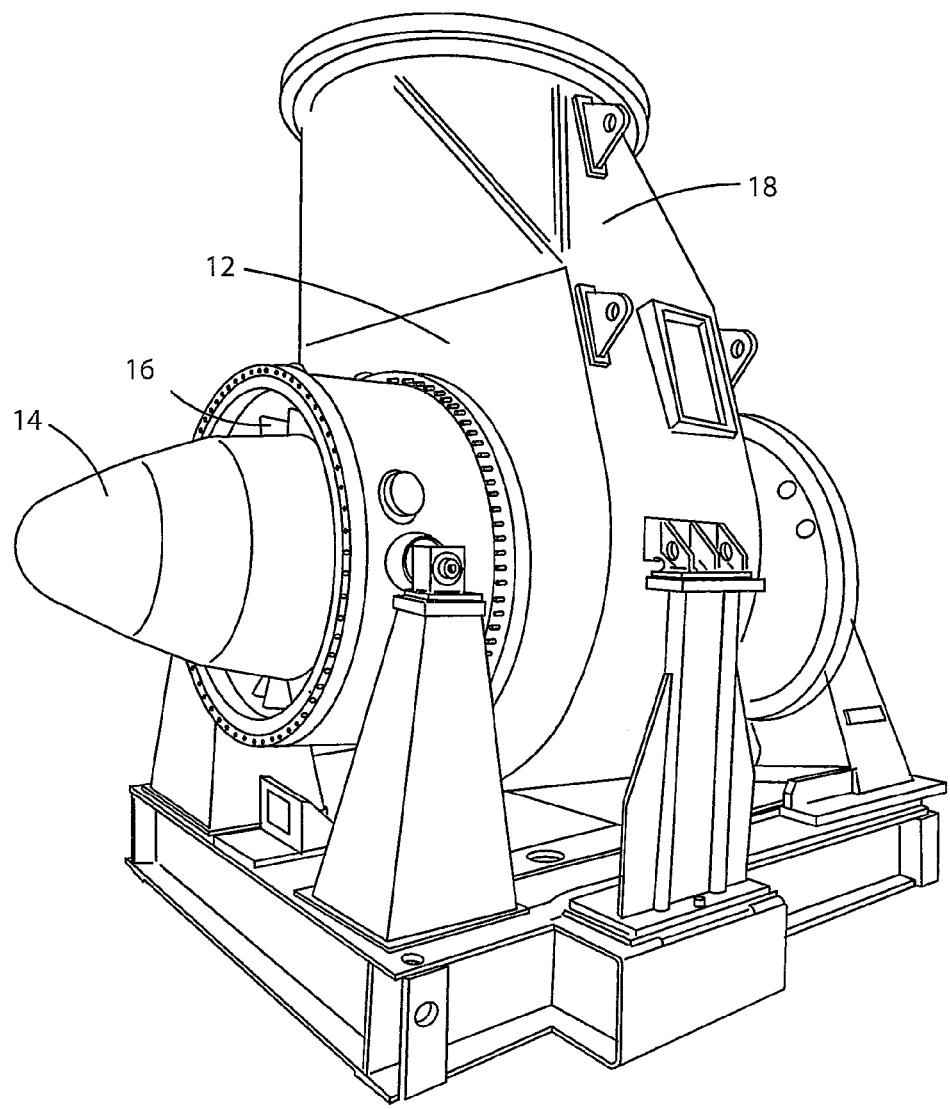
FIG. 1 is an overall view of a conventional expander.
Figure 2:
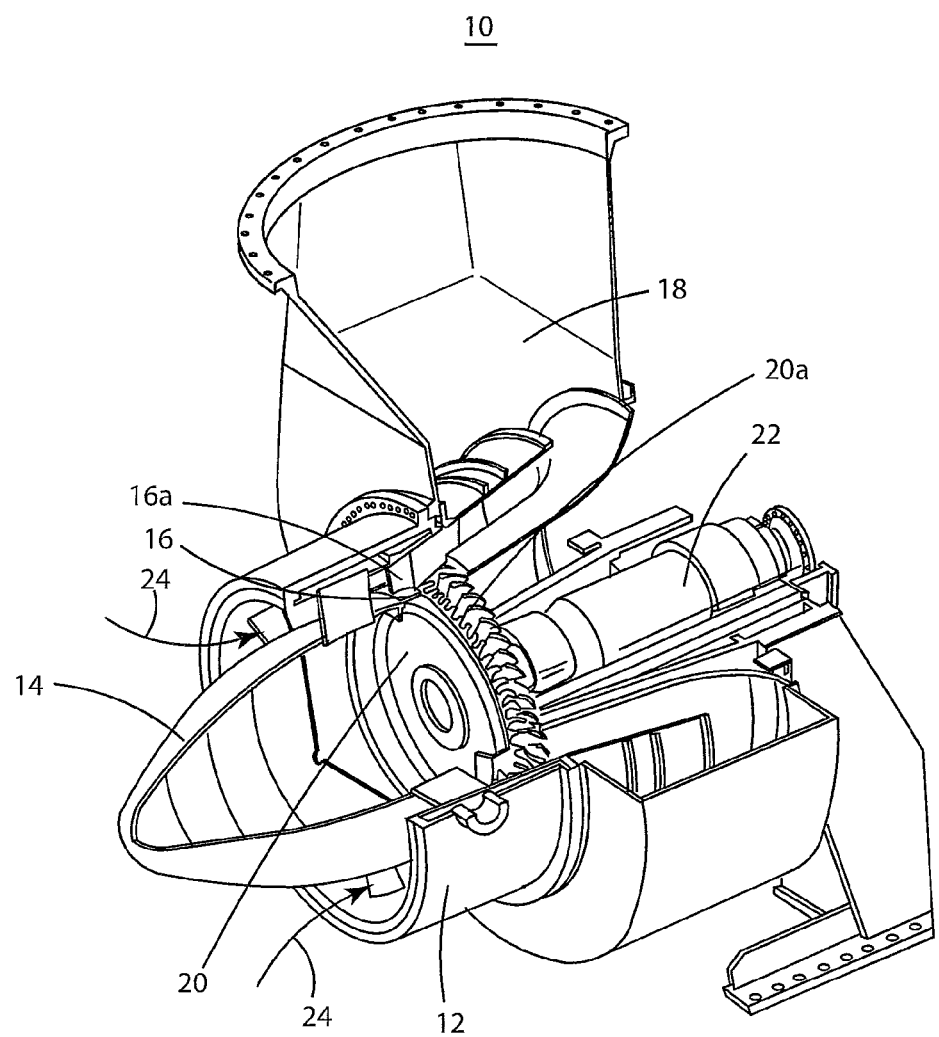
FIG. 2 is a schematic diagram of the expander of FIG. 1.
Figure 3:
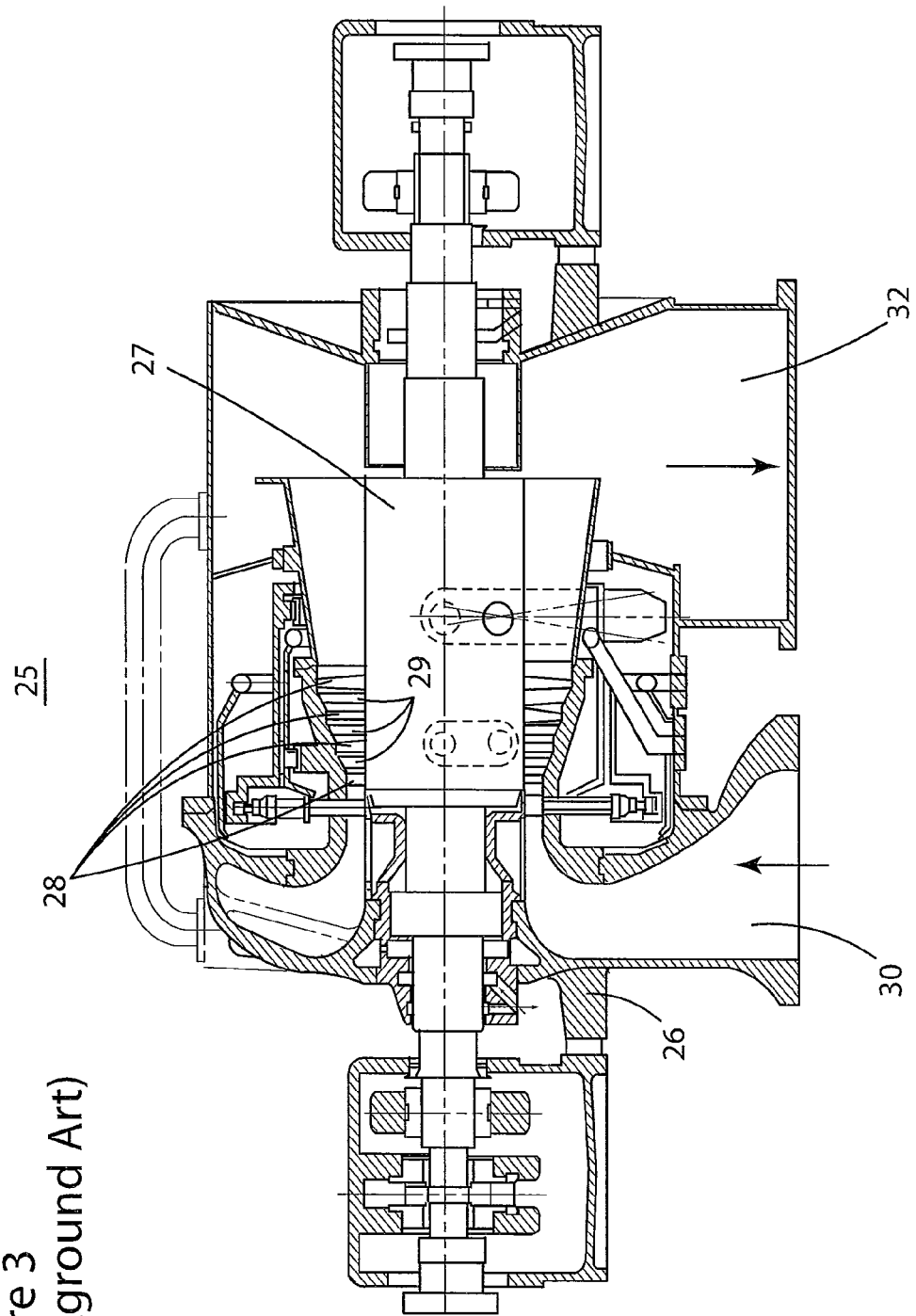
FIG. 3 is a schematic diagram of a traditional axial multistage expander.
Figure 4:
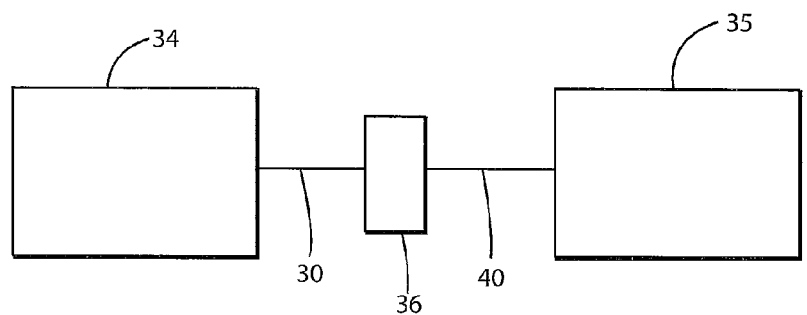
FIG. 4 is a schematic diagram of two expanders connected to each other by an external gearbox.
Figure 9:
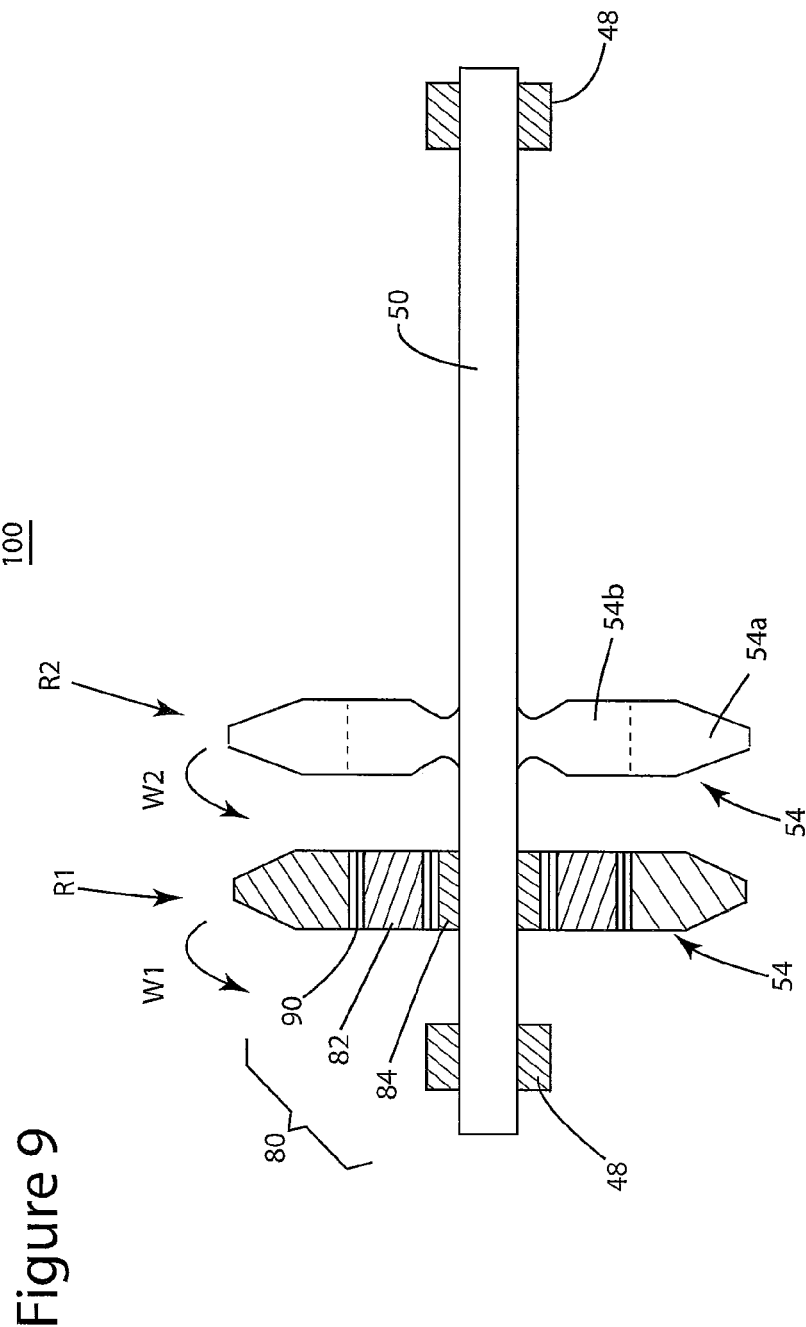
FIG. 9 is a schematic diagram of an expander having an epicyclic gearbox according to an exemplary embodiment.

The first rotoric airfoils having the gearbox 80 described in FIG. 8 is shown implemented, according to an exemplary embodiment, in the expander 100 of FIG. 9. The expander 100 is similar to the expander 40 of FIG. 4 but shows the epicyclic gear 80 connected to the shaft 50 and the rotoric airfoils 54 of the first stage R1. It is noted that the rotoric airfoils of the stages R2 to R6 are fixedly attached to the shaft 50. However, the rotoric airfoils of the stage R1 are rotatably attached to the shaft 50 via the outer ring gear 90, the planet gear 82 and the sun gear 84. Thus, the airfoils of the first stage R1 rotate with a first angular speed cal and the airfoils of the other stages R2-R6 rotate with a second angular speed ω2 different from co1. Other internal gearboxes may be used to achieve the different rotation of one stage relative to other stages inside a single multistage expander. In one application, more than one epicyclic gear boxes may be used inside an axial multistage expander.

Figure 10:
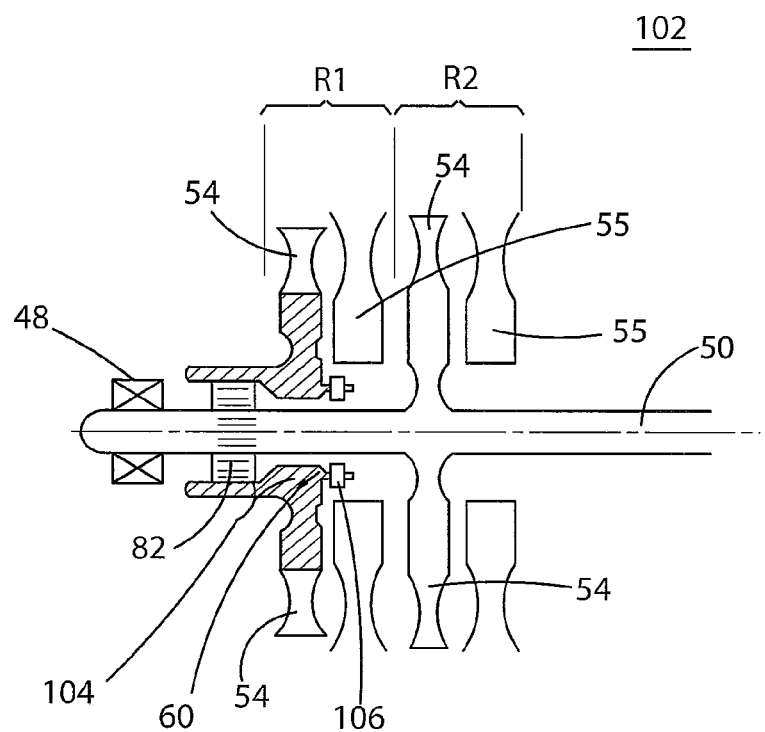
FIG. 10 is a schematic diagram of an expander having an internal gearbox according to another exemplary embodiment.

According to an exemplary embodiment illustrated in FIG. 10, an axial multistage expander 102 includes multiple stages of which only stages R1 and R2 are shown. Stage R1 has the rotoric airfoils 54 connected to a planet gear 82 that is connected to the rotor 50. However, a portion 104 of the rotoric disk 60 extends along the rotor 50 and is supported at an end opposite to the end connecting to the planet gear 82 by one or more wheels 106 or other rotating elements.

Figure 11:
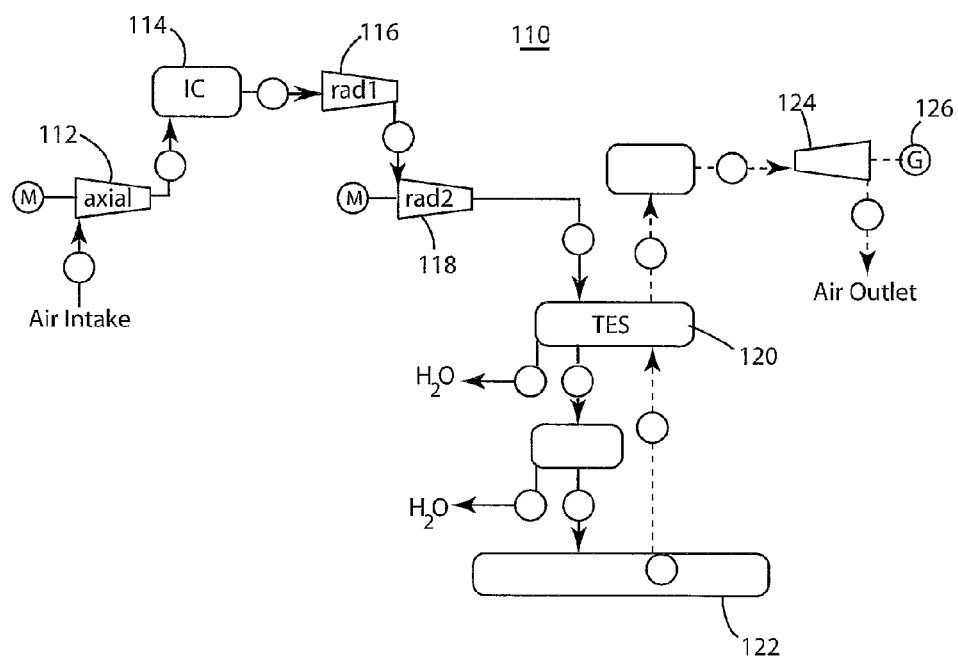
FIG. 11 is a schematic diagram of a power plant using an expander with an internal gearbox according to an exemplary embodiment.

An application of the novel expander is now discussed with regard to FIG. 11. FIG. 11 illustrates an adiabatic compressed air energy storage power plant 110. This kind of power plant 110 includes a compressor 112 configured to provide compressed air to a combustion chamber 114. The compressed air and fuel provided in the combustion chamber is combusted and the resultant hot gases are expanded through an expander 116. The cooled gases are further passed through a second expander 118 to further recover energy. The output of the second expander passes via a thermal energy storage device 120 and are stored in a gas storage device 122 under pressure. When necessary, the gases from gas storage device 122 are provided to an axial multistage expander 124 through the thermal energy storage device 120 in which the gas is heated by means of the thermal energy previously stored in the device 120. The expander 124 drives, for example, a power generator or a centrifugal compressor 126. However, the rotating velocity of the expander 124 may not be freely chosen as the rotating velocity is bound by the particular characteristics of the driven machine 126, with or without an external gearbox However, by using the novel expander illustrated in FIGS. 4 to 10 (an axial multiple stages expander having an internal gear box), different velocities may be provided to the stages, for example 5000 rpm to the first stage R1 and the 3000 rpm to the remaining stages R2 to R6. By using this novel expander, a shaft of stages R2 to R6 may be directly connected to the driven machine 126 without an external gear box.

Figure 12:
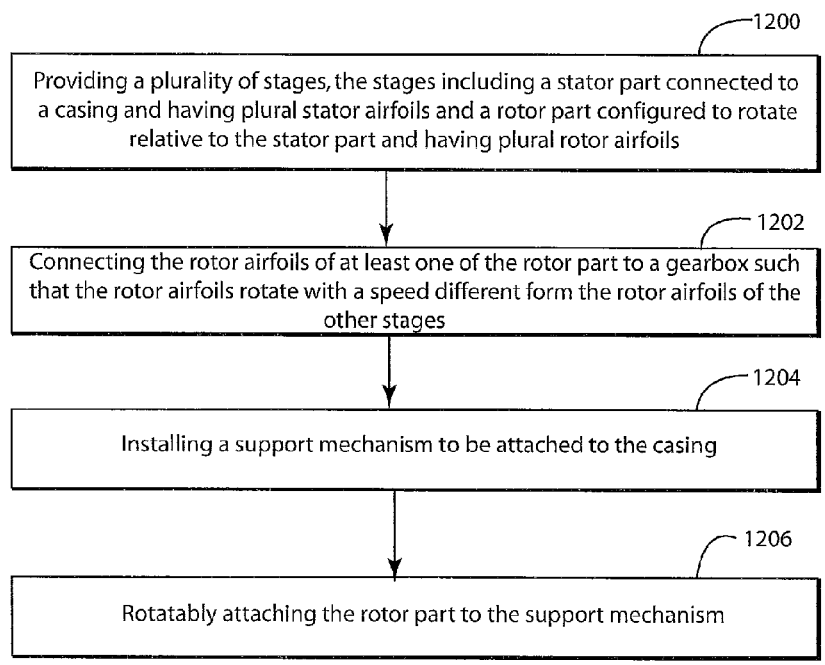
FIG. 12 is a flow chart illustrating a method for assembling an expander according to an exemplary embodiment.

According to an exemplary embodiment illustrated in FIG. 12, there is a method for assembling an axial multistage expander. The method includes a step 1200 of providing a plurality of stages, the stages including a stator part connected to a casing and having plural statoric airfoils and a rotor part configured to rotate relative to the stator part and having plural rotoric airfoils; a step 1202 of connecting the rotoric airfoils of at least one of the rotor part to a gearbox such that the rotoric airfoils rotate with a speed different from the rotoric airfoils of the other stages; a step 1204 of installing a support mechanism to be attached to the casing; and a step 1206 of rotatably attaching the rotor part to the support mechanism.

The disclosed exemplary embodiments provide an expander, a system and a method for expanding a gas through plural stages having different angular speeds. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An axial multistage expander, comprising:
a casing;
a plurality of stages comprising a plurality of rotoric airfoils, at least one stage of the plurality of stages comprising:
   a stator part connected to the casing and having plural statoric airfoils; and
   a rotor part configured to rotate relative to the stator part and having plural rotoric airfoils;
a shaft, wherein the plural rotoric airfoils of the at least one stage of the plurality of stages are mounted on a gearbox, wherein the gearbox is mounted on the shaft and the plural statoric airfoils of the plurality of stages are mounted on the shaft;
a support mechanism connected to the casing and configured to rotatably support the rotor part; and
the gearbox connected between the plural rotoric airfoils of the at least one stage of the plurality of stages and the shaft such that the plural rotoric airfoils of the at least one stage being concentric with the shaft are configured to rotate about the shaft, the gearbox being positioned inside the casing;
wherein the gearbox is epicyclic and comprises:
   a central gear connected to the shaft, the shaft being configured to rotate together with rotor parts of the plurality of stages;
   a planet gear rotatably connected to the central gear; and
   an outer ring gear rotatably connected to the planet gear and configured to rotate the plural rotoric airfoils of the at least one stage;
   wherein the plural rotoric airfoils of the at least one stage of the plurality of stages are configured, based on the connection to the gearbox, to rotate with a speed different from rotoric airfoils of at least one other of the plurality of stages, and
   wherein the stator part, the rotor part, and the support mechanism of the plurality of stages are provided inside the casing.

2. The expander of claim 1, wherein an end tip slope of the rotoric airfoils of the plurality of stages increases along a longitudinal axis of the rotor part.

3. The expander of claim 1, further comprising a generator connected to the shaft of the expander and configured to generate electrical power.

4. The expander of claim 1, wherein the central gear is directly connected to the shaft.

5. The expander of claim 1, further comprising a compressor connected to the shaft.

6. The expander of claim 1, further comprising a pump connected to the shaft.

7. A system for expanding a gas, the system comprising:
an axial multistage expander configured to receive the gas at a temperature and a pressure; and
a driven machine connected to the axial multistage expander and configured to be driven by the axial multistage expander;
wherein the axial multistage expander comprises:
   a casing;
   a plurality of stages comprising a plurality of rotoric airfoils, at least one stage of the plurality of stages comprising:
      a stator part connected to the casing and having plural statoric airfoils, and
      a rotor part configured to rotate relative to the stator part and having plural rotoric airfoils;

a shaft, wherein the plural rotoric airfoils of the at least one stage of the plurality of stages are mounted on a gearbox, wherein the gearbox is mounted on the shaft and the plural statoric airfoils of the plurality of stages are mounted on the shaft;

a support mechanism connected to the casing and configured to rotatably support the rotor part; and the gearbox connected between the plural rotoric airfoils of the at least one stage of the plurality of stages and the shaft such that the plural rotoric airfoils of the at least one stage being concentric with the shaft are configured to rotate about the shaft, the gearbox being positioned inside the casing;

wherein the gearbox is epicyclic and comprises:
 a central gear connected to the shaft, the shaft being configured to rotate together with rotor parts of the plurality of stages;
 a planet gear rotatably connected to the central gear; and
 an outer ring gear rotatably connected to the planet gear and configured to rotate the plural rotoric airfoils of the at least one stage;

wherein the plural rotoric airfoils of the at least one stage of the plurality of stages are configured, based on the connection to the gearbox, to rotate with a speed different from rotoric airfoils of the other stages; and wherein the stator part, the rotor part, and the support mechanism of the plurality of stages are provided inside the casing.

8. The system of claim 7, wherein an end tip slope of the rotoric airfoils of the plurality of stages increases along a longitudinal axis of the rotor part.

9. The system of claim 7, further comprising a generator connected to the shaft of the expander and configured to generate electrical power.

10. The expander of claim 7, wherein the central gear is directly connected to the shaft.

11. The expander of claim 7, further comprising a compressor connected to the shaft.

12. The expander of claim 7, further comprising a pump connected to the shaft.

* * * * *